May 11, 1926. 1,584,105
W. A. LENZ
REFLECTOR
Filed March 30, 1925
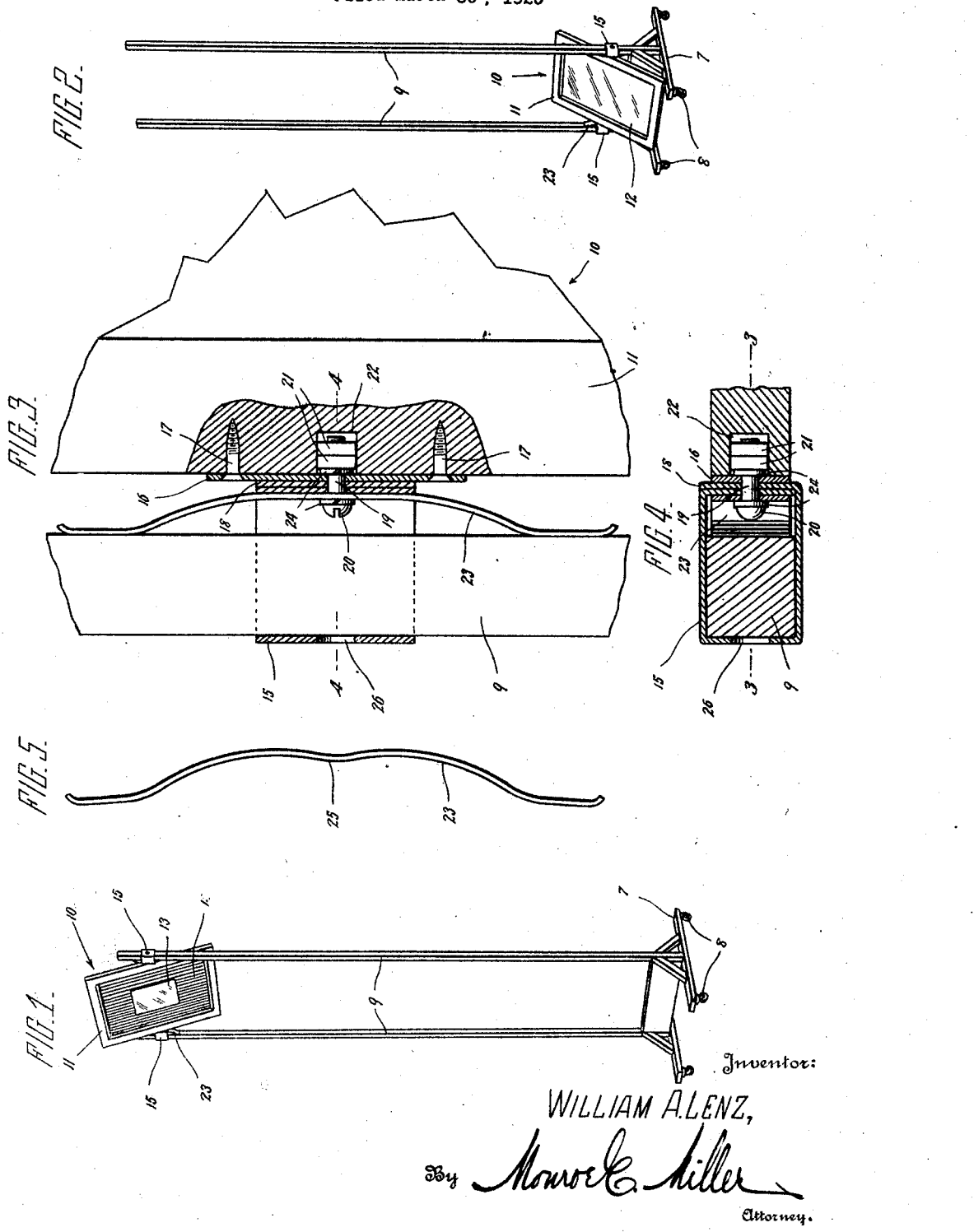
Inventor:
WILLIAM A. LENZ,
By Monroe E. Miller
Attorney.

Patented May 11, 1926.

1,584,105

UNITED STATES PATENT OFFICE.

WILLIAM A. LENZ, OF LEBANON, MISSOURI.

REFLECTOR.

Application filed March 30, 1925. Serial No. 19,515.

The present invention relates to reflectors, such as are used by photographers for reflecting light to objects when photographed, and the invention aims to provide a novel and improved device of that kind for use by photographers and others, including means for supporting a mirror or reflecting member for vertical adjustment and for turning movement about a horizontal axis at different elevations.

Another object of the invention is to provide novel means for mounting a mirror or reflecting member for adjustment to different altitudes or heights and for turning movement to different angular positions in its different vertical adjustments, in order that the light reflected by the mirror may be directed in the desired direction to an object.

A still further object of the invention is to provide novel means for pivotally and slidably connecting a mirror or similar member with a stand or other support, and for maintaining the mirror or member in its different adjustments.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a perspective view of the reflector with the mirror in its highest position and the small mirror surface disposed forwardly.

Fig. 2 is a perspective view of the device showing the mirror in its lowermost position and the large mirror surface disposed forwardly.

Fig. 3 is a detail view of one of the sliding and pivotal connections between the mirror and stand, taken on the line 3—3 of Fig. 4, portions being shown in elevation.

Fig. 4 is a sectional view on the line 4—4 of Fig. 3.

Fig. 5 is an edge view of one of the leaf springs showing the shape thereof before being assembled with the other parts.

In carrying out the invention there is provided a stand or support including a suitable base 7 preferably mounted on casters 8 so that the stand may be conveniently moved about on the floor, and the stand includes a pair of standards or posts 9 rising vertically from the base to a suitable height and spaced apart parallel with one another. The stand may be constructed of wood or metal, and the standards or bars 9 support the mirror or reflecting member 10 which is mounted between said standards.

The mirror 10 is of suitable size and comprises a frame 11 having a panel therein provided with a large mirror surface 12 at one side and a small mirror surface 13 at the opposite side, the field or space 14 between the surface 13 and frame 11 being of dull or non-reflecting nature. The opposite mirror surfaces may be brought into play by reversing the mirror in order that either broad or narrow beams of light may be reflected.

The mirror or member 10 is mounted for sliding and pivotal movements in the stand. For this purpose, a slide 15 is movable on each standard or bar 9 and is pivotally connected with a plate 16 secured to the corresponding side edge of the frame 11 by screws 17 or otherwise. Each slide 15 is bent from a bar or strip into rectangular loop shape so as to pass over the standard 9, and with the terminals of the strip overlapped, as at 18, adjacent to the plate 16. A pivot bolt 19 engages through apertures in the terminals 18 and plate 16 for pivotally connecting the inner portion of the slide with the plate 16 and frame 11. The head 20 of the bolt is located within the slide 15 between the standard 9 and terminals 18, and nuts 21 are screw-threaded on the bolt and are located within a recess or cavity 22 provided in the edge portion of the frame 11, one of said nuts serving as a lock nut for the other to prevent the bolt from loosening. The mirror or member 10 can therefore move with the slides 15 along the standards or bars 9, and the mirror may also be rotated or turned about the horizontal axis of the pivot bolts 19 at the opposite sides.

In order to create friction for maintaining the adjustment of the mirror, a double or bowed leaf spring 23 is disposed within each slide with its terminals bearing against the inner side of the corresponding standard 9, and the intermediate portion of the spring engages the bolt 19. The spring is under pressure between the slide 15 and standard 9 to create sufficient friction to prevent the mirror from sliding on the stand accidentally, although the mirror may be moved up and down easily by hand. Furthermore, the intermediate portion of the spring has a reverse bowed portion 25, as seen in Fig. 5, which is straightened out against the inner portion of the slide 15 when the bolt 19 is tightened, and the tension obtained will hold the plate 16 and slide 15 together under spring pressure, so that friction is sufficient to prevent the mirror 10 from turning accidentally on its pivots, but permitting the mirror to be turned conveniently by hand to different angular positions. The single spring at each side therefore supplies the friction to prevent both the accidental sliding and turning movements of the mirror when adjusted to a desired position. Spring washers 24 are also disposed on each bolt 19, one between the slide 15 and head of the bolt and the other between the plate 16 and nuts 21, which in being under pressure when the bolt is tightened will assist the spring 23 in creating friction between the slide 15 and plate 16.

Each slide 15 has an aperture 26 at its outer portion through which a screw-driver may be inserted, when the mirror 10 is removed from the stand, in order that the bolt 19 may be rotated for separating or assembling the parts. It is apparent that the upper end of the stand being open, with the upper ends of the standards or bars 9 disconnected, will permit the mirror and slide 15 to be removed upwardly from the stand. When the mirror is removed from the stand, the bolts 19 may be rotated by inserting a screw-driver or other implement through the apertures 26, so as to regulate the friction between the slides and mirror.

Both sides of the stand are alike, so that the stand may be turned around or reversed side for side, and the stand may also be moved about conveniently on the floor to the desired position as well as being turned about a vertical axis. The mirror is readily slid upwardly and downwardly to the desired height, and the mirror is also readily reversed so that either the large mirror surface 12 or the small mirror surface 13 may be brought into position for reflecting the light. The mirror may be located higher up than the object for reflecting the light downwardly at an angle, or may be located lower down to reflect the light upwardly at an angle. A wide latitude of adjustment is therefore permitted to reflect the light, either in a large or small beam, at different angles and elevations.

The device is intended especially for use by photographers, but the improvements may be used for other appropriate purposes also.

Having thus described the invention, what is claimed as new is:—

1. In a device of the character described, a bar, a slide movable on said bar, a reflecting member pivotally connected with said slide, and a spring having a yieldable portion between the slide and bar for creating friction between them, and having another independently yieldable portion arranged to yield and create friction between the slide and reflecting member.

2. In a device of the character described, a bar, a slide movable on the bar, a reflecting member, a pivot element connecting said member and slide, and a spring having a yieldable portion disposed between the slide and bar for creating friction between them, and having an independently yieldable portion engaging said pivot element to yield and provide friction between the slide and reflecting member.

3. In a device of the character described, a bar, a slide movable thereon, a reflecting member, a pivot element connecting said member and slide, and a leaf spring having a terminal portion between the slide and bar for creating friction between them, and having another independently yieldable portion engaging said pivot element to yield and create friction between the slide and reflecting member.

4. In a device of the character described, a bar, a slide movable on the bar, a reflecting member, a pivot element connecting said member and slide, and a bowed leaf spring having its intermediate portion engaging said pivot element within the slide and its terminals bearing against said bar to create friction between the bar and slide, the intermediate portion of said spring having independently yieldable means to create friction between said member and slide.

5. A device of the character described comprising parallel bars, slides movable thereon, a reflecting member between said bars, pivot elements connecting said member and slides, and bowed leaf springs having their intermediate portions secured by said elements and having their terminals bearing against said bars, said springs having yieldable portions yieldable independently of the terminals of the springs and arranged to be flexed to create friction between said slides and member.

6. A device of the character described comprising parallel bars, slides surrounding and movable on said bars, a reflecting member between said slides, pivot bolts connecting said member and slides, and bowed leaf springs having their intermediate portions secured by said elements within said slides and having their terminals bearing against said bars, said leaf springs having said intermediate portions thereof bowed reversely, and straightened out when said pivot elements are tightened so as to create friction between said slides and member.

In testimony whereof I hereunto affix my signature.

WILLIAM A. LENZ.